(12) United States Patent
Levy et al.

(10) Patent No.: US 7,733,276 B2
(45) Date of Patent: Jun. 8, 2010

(54) ANTENNA SYSTEM FOR NOTEBOOK COMPUTER AND METHOD FOR COMMUNICATING IN MULTIPLE WIRELESS SYSTEMS

(75) Inventors: Shmuel Levy, Q. Tivon (IL); David G. Leeper, Scottsdale, AZ (US)

(73) Assignee: Intel Corporation, Santa Clara, CA (US)

( * ) Notice: Subject to any disclaimer, the term of this patent is extended or adjusted under 35 U.S.C. 154(b) by 881 days.

(21) Appl. No.: 11/558,139

(22) Filed: Nov. 9, 2006

(65) Prior Publication Data

US 2008/0111746 A1    May 15, 2008

(51) Int. Cl.
*H01Q 1/38* (2006.01)
*H01Q 3/24* (2006.01)
(52) U.S. Cl. .................. 343/702; 343/876; 343/858
(58) Field of Classification Search .............. None
See application file for complete search history.

(56) References Cited

U.S. PATENT DOCUMENTS

| 6,057,866 A | * | 5/2000 | Haneda et al. | 347/118 |
| 6,667,723 B2 | * | 12/2003 | Forrester | 343/858 |
| 2008/0096492 A1 | * | 4/2008 | Yoon | 455/83 |

* cited by examiner

*Primary Examiner*—Trinh V Dinh
(74) *Attorney, Agent, or Firm*—Schwegman, Lundberg & Woessner, P.A.; Gregory J. Gorrie

(57) ABSTRACT

Embodiments of an antenna system for notebook, laptop and portable computers and methods for communicating in multiple wireless systems are generally described herein. Other embodiments may be described and claimed. In some embodiments, a notebook computer comprises a plurality of transceivers, a plurality of antennas coupled to the transceivers with coaxial cables, and signal separation circuitry coupled to at least one of the coaxial cables to allow the at least one coaxial cable to be shared by two or more of the transceivers.

11 Claims, 1 Drawing Sheet

WIRELESS COMMUNICATION DEVICE

ANTENNA SYSTEM FOR NOTEBOOK COMPUTER AND METHOD FOR COMMUNICATING IN MULTIPLE WIRELESS SYSTEMS

TECHNICAL FIELD

Some embodiments of the present invention pertain to wireless communication systems. Some embodiments pertain to antenna systems for notebook, laptop or portable computers.

BACKGROUND

Notebook, laptop and portable computers are desirably configured to communicate with more than one wireless communication system, such as wireless local area networks (WLANs), broadband wireless access (BWA) networks, ultra-wide-band (UWB) networks, Bluetooth™ systems and cellular-type systems. One problem with this is that due to their physical and packaging constraints, notebook, laptop and portable computers are generally configured to communicate with only one or two of these wireless systems. For example, physical space in the lid may limit the number of antennas that may be provided. Furthermore, there may be insufficient space for coaxial cables that may be used to connect the various antennas in the lid to the transceiver circuitry in the base.

Thus, there are general needs for antenna systems suitable for notebook, laptop or portable computers and methods for communicating with various wireless systems. There are also general needs for antenna systems and methods for communicating with various wireless systems that meet the physical and packaging constraints of notebook, laptop or portable computers.

DETAILED DESCRIPTION

Figure 1:
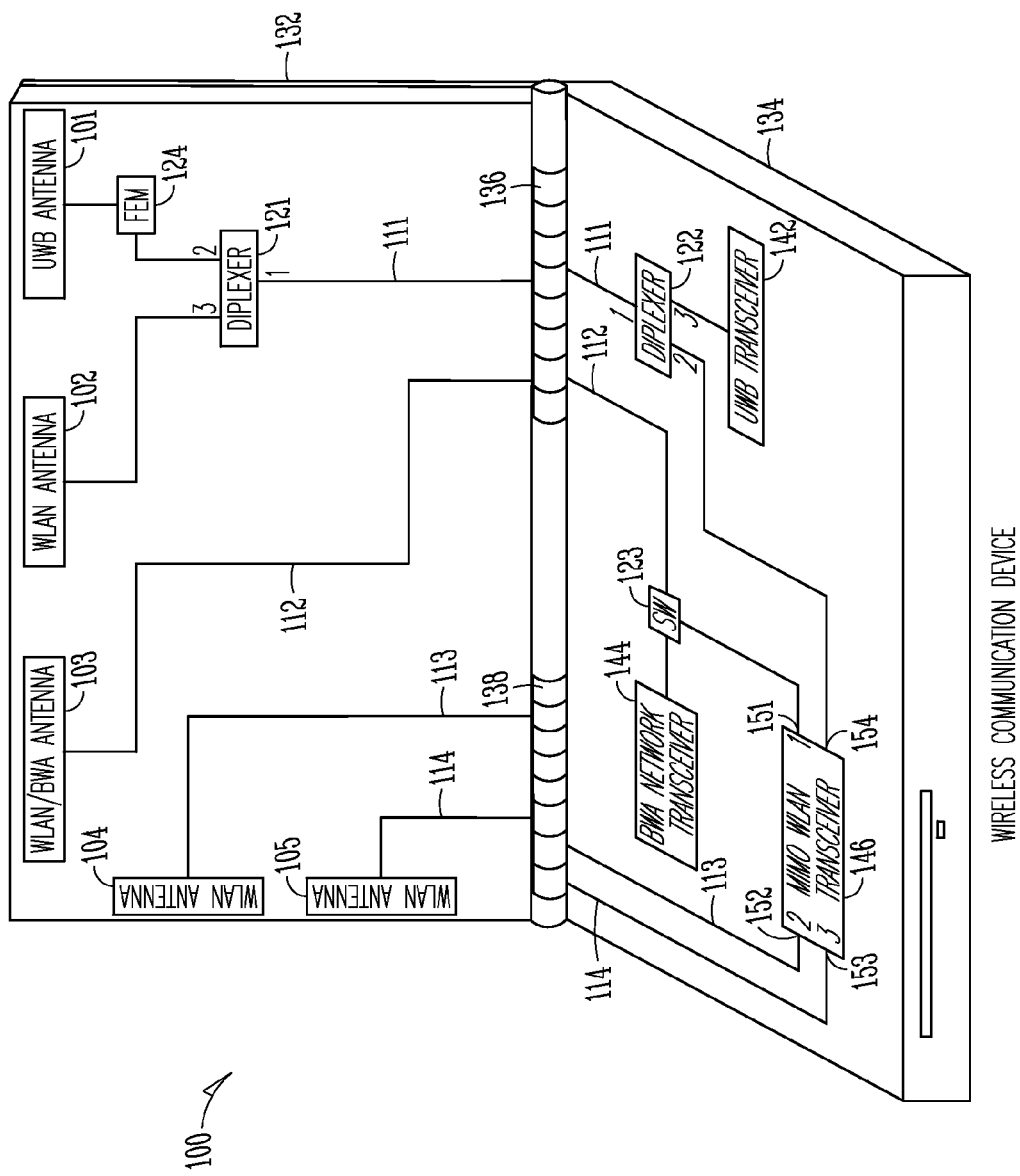
FIG. 1 is a functional block diagram of a wireless communication device in accordance with some embodiments of the present invention.

The following description and the drawings sufficiently illustrate specific embodiments of the invention to enable those skilled in the art to practice them. Other embodiments may incorporate structural, logical, electrical, process, and other changes. Examples merely typify possible variations. Individual components and functions are optional unless explicitly required, and the sequence of operations may vary. Portions and features of some embodiments may be included in, or substituted for those of other embodiments. Embodiments of the invention set forth in the claims encompass all available equivalents of those claims. Embodiments of the invention may be referred to herein, individually or collectively, by the term "invention" merely for convenience and without intending to limit the scope of this application to any single invention or inventive concept if more than one is in fact disclosed.

FIG. 1 is a functional block diagram of a wireless communication device in accordance with some embodiments of the present invention. Wireless communication device 100 may be a notebook, laptop or portable computer and may communicate with several wireless systems.

In accordance with the embodiments illustrated in FIG. 1, wireless communication device 100 includes transceivers 142, 144 and 146 and antennas 101 102, 103 and 104 coupled to the transceivers 142, 144 and 146 with coaxial cables 111, 112, 113 and 114. Wireless communication device 100 also includes signal separation circuitry, shown as diplexers 121 and 122, coupled to coaxial cable 111 allowing coaxial cable 111 to be shared by two of the transceivers. Antennas 101 102, 103 and 104 may be positioned in lid 132 of wireless communication device 100 and transceivers 142, 144 and 146 may be provided in base 134 of wireless communication device 100.

In some embodiments, wireless communication device 100 includes UWB transceiver 142, BWA network transceiver 144 and WLAN transceiver 146. In these embodiments, diplexer 121 has a first port coupled to coaxial cable 111, antenna 101 is coupled to a second port of diplexer 121, and antenna 102 is coupled to a third port of diplexer 121. In these embodiments, diplexer 122 has a first port coupled to coaxial cable 111, a second port coupled to receive port 154 of WLAN transceiver 146, and a third port coupled to a receive and transmit (RX/TX) port of UWB transceiver 142. In some embodiments, wireless communication device 100 may include antenna 103 coupled to coaxial cable 112 and switch 123 to selectively couple coaxial cable 112 to either RX/TX port 151 of WLAN transceiver 146 or BWA network transceiver 144.

As illustrated, coaxial cables 111 and 112 may be provided through one or more of hinges 136 and 138 coupling base 134 and lid 132 of wireless communication device 100. Coaxial cable 111 is shared by the UWB transceiver 142 and receive port 154 of WLAN transceiver 146.

In some embodiments, wireless communication device 100 may include antenna 104 coupled to RX/TX port 152 of WLAN transceiver 146 with coaxial cable 113, and antenna 105 coupled to RX/TX port 153 of WLAN transceiver 146 with coaxial cable 114. In these embodiments, coaxial cables 113 and 114 may also be provided through one or more of hinges 136 and 138.

As illustrated in FIG. 1, coaxial cables 111 and 112 may be provided through hinge 136 and coaxial cables 113 and 114 may be provided through hinge 138. In some of these embodiments, hinges 136 and 138 may have room for a maximum of two coaxial cables to pass through, although the scope of the invention is not limited in this respect. In these embodiments, a four-cable solution is provided for a system that may conventionally require at least five cables.

In the embodiments illustrated in FIG. 1, antennas 101, 102, 103, 104 and 105 and diplexer 121 may be provided in lid 132. Diplexer 122, switch 123, UWB transceiver 142, WLAN transceiver 146 and BWA network transceiver 144 may be provided in the base 134. In some embodiments, lid 132 may, for example, include a screen, such as a liquid-crystal display (LCD) and other circuitry not illustrated. Base 134 may, for example, include a keyboard and other processing circuitry not illustrated. Other types of signal separation circuitry may be used for diplexers 121 and 122, however the use of diplexers helps minimize signal loss.

In some embodiments, WLAN transceiver 146 may be a 3×4 multiple-input multiple-output (MIMO) WLAN transceiver. In these MIMO embodiments, WLAN transceiver 146 may transmit MIMO WLAN signals using the antennas 103, 104 and 105 and may receive MIMO WLAN signals using antennas 102, 103, 104 and 105, although the scope of the invention is not limited in this respect. Other MIMO transceiver configurations (i.e., with different numbers and combinations of receive and transmit antennas) may also be suitable.

In some embodiments, wireless communication device 100 may also include front-end module (FEM) 124 coupled between antenna 101 and the second port of diplexer 121. FEM 124 may downconvert UWB signals received through antenna 101 and may upconvert and amplify UWB signals for transmission by antenna 101. As illustrated, FEM 124 may be provided in lid 132. In some embodiments, FEM 124 may upconvert signals from a 3-5 gigahertz (GHz) frequency band provided by UWB transceiver 142 to a 9-11 GHz band. FEM 124 may also downconvert UWB signals received through antenna 101 from the 9-11 GHz band to the 3-5 GHz frequency band for processing by UWB transceiver 142, although the scope of the invention is not limited in this respect.

In some embodiments, the transmit power level of UWB transceiver 142 may be reduced and/or attenuated to approximately −35 dBm to help prevent receive port 154 of WLAN transceiver 146 from being exposed to high signal levels from UWB transceiver 142, although the scope of the invention is not limited in this respect. In these embodiments, receive port 154 may be a receive-only port. In some embodiments, FEM 124 may include a power amplifier to amplify signals from UWB transceiver 142 to approximately −10 dBm prior to transmission by antenna 101, although the scope of the invention is not limited in this respect. Diplexers 121 and 122 may provide sufficient isolation between their second and third ports to further help prevent receive port 154 from being exposed to high signal levels from UWB transceiver 142.

In some embodiments, a separate attenuator may be provided in the transmit signal path of UWB transmitter 142 to reduce signal levels, while in other embodiments, UWB transmitter 142 may employ transmit-power control circuitry to provide at least 12 dB of power reduction. Some other embodiments may employ both a separate attenuator in the transmit signal path of UWB transmitter 142 and transmit-power control circuitry within UWB transmitter 142 for additional attenuation.

Some alternate embodiments do not require FEM 124. In these alternate embodiments, diplexers 121 and 122 may provide additional isolation to help prevent interference between UWB transceiver 142 and WLAN transceiver 146 (i.e., to help prevent receive port 154 from being exposed to high signal levels from UWB transceiver 142). In these embodiments, UWB transceiver 142 may use UWB bands 1 and 2

In some embodiments, antenna 101 may transmit and receive UWB communication signals, antenna 102 may receive WLAN communication signals, and diplexers 121 and 122 separate the WLAN communication signals from the UWB communication signals. Antenna 103, antenna 104 and antenna 105 may also transmit and receive WLAN communication signals. Antenna 103 may also transmit and receive BWA network communication signals when switch 123 couples BWA network transceiver 144 to coaxial cable 112. In these embodiments, diplexers 121 and 122 may allow simultaneous operation of UWB transceiver 142 and WLAN transceiver 146.

In some embodiments, UWB transceiver 142 and WLAN transceiver 146 may safely share coaxial cable 111 because no WLAN signal is transmitted by antenna 102 to interfere with UWB transceiver 142. In these embodiments, UWB transceiver 142 and WLAN transceiver 146 may safely share coaxial cable 111 because the power level of the signals transmitted by UWB transceiver 142 are attenuated to reduce exposure of WLAN transceiver 146 to high signal levels. In some embodiments, UWB transceiver 142 and WLAN transceiver 146 may safely share coaxial cable 111 because diplexers 121 and 122 provide additional isolation between UWB and WLAN signals while reducing the coupling losses for both the UWB and WLAN systems.

In some alternate embodiments, wireless communication device 100 may include other types of transceivers. For example, any one of transceivers 142, 144 and/or 146 may be a WiMedia transceiver, a cellular or third-generation (3G) cellular transceiver, a Bluetooth™ transceiver, a television or radio receiver, or a GPS receiver. In some of the alternate embodiments, diplexers 121 and 122 may be replaced with triplexers to allow the sharing of additional cables, although the scope of the invention is not limited in this respect.

In some embodiments, when wireless communication device 100 is a notebook, laptop or portable computer, and when UWB transceiver 142 and WLAN transceiver 146 operate simultaneously, an application running on the computer may communicate using UWB transceiver 142, and another application running on the notebook computer may communicate using WLAN transceiver 146, although the scope of the invention is not limited in this respect.

In some embodiments, antennas 101, 102, 103, 104 and 105 may comprise directional or omnidirectional antennas, including, for example, dipole antennas, monopole antennas, patch antennas, loop antennas, microstrip antennas or other types of antennas suitable for transmission of radio-frequency (RF) signals. In some embodiments, instead of two or more antennas, a single antenna with multiple apertures may be used. In these embodiments, each aperture may be considered a separate antenna. In some embodiments that use monopole antennas in lid 132, a grounded metal frame or foil associated with the display may serve as the ground plane for the antennas, although the scope of the invention is not limited in this respect.

In some embodiments, antennas 102, 103, 104 and 105 may comprise patch antennas having dimensions selected to communicate narrower-band RF signals between 2 and 11 GHz for some WLANs and BWA networks. Antenna 101 may comprise a wide band antenna selected to communicate UWB RF signals, although the scope of the invention is not limited in this respect.

In some embodiments, wireless communication device 100 may be a personal digital assistant (PDA), a web tablet, a wireless telephone, a wireless headset, a pager, an instant messaging device, a digital camera, an access point, a television, a medical device (e.g., a heart rate monitor, a blood pressure monitor, etc.), or other device that may receive and/or transmit information wirelessly.

Although wireless communication device 100 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, application specific integrated circuits (ASICs), and combinations of various hardware and logic circuitry for performing at least the functions described herein.

In some embodiments, WLAN transceiver 146 may communicate using multicarrier communication signals, such as orthogonal frequency division multiplexed (OFDM) communication signals, over a multicarrier communication channel. The multicarrier communication channel may be within a predetermined frequency spectrum and may comprise a plurality of orthogonal subcarriers. In some embodiments, the multicarrier signals may be defined by closely spaced OFDM subcarriers. In some embodiments, WLAN transceiver 146 may communicate using spread-spectrum signals, although the scope of the invention is not limited in this respect. In some embodiments, WLAN transceiver 146 may be Wireless Fidelity (WiFi) transceiver.

In some embodiments, BWA network transceiver 144 may communicate in accordance with a multiple access technique, such as orthogonal frequency division multiple access (OFDMA), although the scope of the invention is not limited in this respect. In some embodiments, BWA network transceiver 144 may be a Worldwide Interoperability for Microwave Access (WiMax) transceiver or WiMedia transceiver, although the scope of the invention is not limited in this respect.

In some embodiments, the frequency spectrums for the communication signals communicated by WLAN transceiver 146 may comprise either a 5 gigahertz (GHz) frequency spectrum or a 2.4 GHz frequency spectrum. In these embodiments, the 5 GHz frequency spectrum may include frequencies ranging from approximately 4.9 to 5.9 GHz, and the 2.4 GHz spectrum may include frequencies ranging from approximately 2.3 to 2.5 GHz, although the scope of the invention is not limited in this respect, as other frequency spectrums are also equally suitable. In some embodiments, the frequency spectrum for the communication signals communicated by BWA network transceiver 144 may comprise frequencies between 2 and 11 GHz, although the scope of the invention is not limited in this respect. In some embodiments, the frequency spectrum for the communication signals communicated by UWB transceiver may comprise a UWB spectrum of 7.5 GHz in the 3.1 to 10.6 GHz band, although the scope of the invention is not limited in this respect.

In some embodiments, WLAN transceiver 146 may receive signals in accordance with specific communication standards, such as the Institute of Electrical and Electronics Engineers (IEEE) standards including IEEE 802.11(a), 802.11(b), 802.11(g), 802.11(h) and/or 802.11(n) standards and/or proposed specifications for WLANs, although the scope of the invention is not limited in this respect as they may also be suitable to transmit and/or receive communications in accordance with other techniques and standards. In some embodiments, BWA network transceiver 144 may receive signals in accordance with the IEEE 802.16-2004 and the IEEE 802.16(e) standards for wireless metropolitan area networks (WMANs) including variations and evolutions thereof, although the scope of the invention is not limited in this respect as they may also be suitable to transmit and/or receive communications in accordance with other techniques and standards. For more information with respect to the IEEE 802.11 and IEEE 802.16 standards, please refer to "IEEE Standards for Information Technology—Telecommunications and Information Exchange between Systems"—Local Area Networks—Specific Requirements—Part 11 "Wireless LAN Medium Access Control (MAC) and Physical Layer (PHY), ISO/IEC 8802-11: 1999", and Metropolitan Area Networks—Specific Requirements—Part 16: "Air Interface for Fixed Broadband Wireless Access Systems," May 2005 and related amendments/versions. Some embodiments relate to the IEEE 802.11e proposed enhancement to the IEEE 802.11 WLAN specification that will include quality-of-service (QoS) features, including the prioritization of data, voice, and video transmissions.

In some embodiments, wireless communication device 100 may include a transceiver that may communicate in accordance with standards such as the Pan-European mobile system standard referred to as the Global System for Mobile Communications (GSM). In some embodiments, wireless communication device 100 may include a transceiver that may operate in accordance with packet radio services such as the General Packet Radio Service (GPRS) packet data communication service. In some embodiments, wireless communication device 100 may include a transceiver that may communicate in accordance with the Universal Mobile Telephone System (UMTS) for the next generation of GSM, which may, for example, implement communication techniques in accordance with 2.5G and 3G wireless standards (See 3GPP Technical Specification, Version 3.2.0, March 2000). In some embodiments, wireless communication device 100 may include a transceiver that may provide packet data services (PDS) utilizing packet data protocols (PDP). In some embodiments, wireless communication device 100 may include a transceiver that may communicate in accordance with other standards or other air-interfaces including interfaces compatible with the enhanced data for GSM evolution (EDGE) standards (see 3GPP Technical Specification, Version 3.2.0, March 2000), although the scope of the invention is not limited in this respect.

In some embodiments, wireless communication device 100 may include a transceiver that may communicate in accordance with a short-range wireless standard such as the Bluetooth™ short-range digital communication protocol. Bluetooth™ wireless technology is a de facto standard, as well as a specification for small-form factor, low-cost, short-range radio links between mobile PCs, mobile phones and other portable devices. (Bluetooth is a trademark owned by Bluetooth SIG, Inc.).

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims.

In the foregoing detailed description, various features are occasionally grouped together in a single embodiment for the purpose of streamlining the disclosure. This method of disclosure is not to be interpreted as reflecting an intention that the claimed embodiments of the subject matter require more features than are expressly recited in each claim. Rather, as the following claims reflect, invention may lie in less than all features of a single disclosed embodiment. Thus, the following claims are hereby incorporated into the detailed description, with each claim standing on its own as a separate embodiment.

What is claimed is:

1. An antenna system comprising:
a first diplexer having a first port coupled to a first coaxial cable;
a first antenna coupled to a second port of the first diplexer;
a second antenna coupled to a third port of the first diplexer;
a second diplexer having a first port coupled to the first coaxial cable, a second port coupled to a receive port of a wireless local area network (WLAN) transceiver, and a third port coupled to a receive and transmit (RX/TX) port of an ultra-wide band (UWB) transceiver;
a switch to selectively couple a second coaxial cable to either a first RX/TX port of the WLAN transceiver or a broadband wireless access (BWA) network transceiver; and
a third antenna coupled to the second coaxial cable.

2. The antenna system of claim 1 wherein the first and second coaxial cables are provided through one or more hinges coupling a base and a lid of a wireless communication device, and
wherein the first coaxial cable is shared by the UWB transceiver and the receive port of the WLAN transceiver.

3. The antenna system of claim 2 further comprising:
   a fourth antenna coupled to a second RX/TX port of the WLAN transceiver with a third coaxial cable; and
   a fifth antenna coupled to a third RX/TX port of the WLAN transceiver with a fourth coaxial cable,
   wherein the third and fourth coaxial cables are further provided through the one or more hinges.

4. The antenna system of claim 3 wherein the wireless communication device is a notebook computer,
   wherein the first, second, third, fourth and fifth antennas, and the first diplexer are provided in the lid,
   wherein the second diplexer, the switch, the UWB transceiver, the WLAN transceiver and the BWA network transceiver are provided in the base.

5. The antenna system of claim 3 wherein the second, third and fourth antennas are patch antennas having dimensions selected to communicate narrower-band RF signals between 2 and 11 GHz, and
   wherein the first antenna comprises a wide-band antenna selected to communication UWB RF signals.

6. The antenna system of claim 4 wherein the WLAN transceiver is a 3×4 multiple-input multiple-output (MIMO) transceiver that transmits WLAN signals using the third, fourth and fifth antennas and receives WLAN signals using the second, third, fourth and fifth antennas.

7. The antenna system of claim 4 wherein one or more of the first, second, third, fourth and fifth antennas comprise a monopole antenna, and
   wherein a metallic frame associated with a display in the lid serves as a ground plane for the one or more of the first, second, third, fourth and fifth antennas.

8. The antenna system of claim 6 further comprising a front-end module (FEM) coupled between the first antenna and the second port of the first diplexer to downconvert UWB signals received through the first antenna and to upconvert and amplify UWB signals for transmission by the first antenna,
   wherein the FEM is provided in the lid.

9. The antenna system of claim 6 wherein the first antenna transmits and receives UWB communication signals,
   wherein the second antenna receives WLAN communication signals,
   wherein the first and second diplexers separate the WLAN communication signals from the UWB communication signals,
   wherein the third antenna, the fourth antenna and the fifth antenna transmit and receive the WLAN communication signals,
   wherein the third antenna further transmits and receives BWA network communication signals, and
   wherein the first and second diplexers allow simultaneous operation of the UWB transceiver and the WLAN transceiver.

10. The antenna system of claim 8 wherein a transmit power level of the UWB transceiver is reduced to help prevent the receive port from being exposed to high signal levels from the UWB transceiver,
    wherein the FEM includes a power amplifier to amplify signals from the UWB transceiver prior to transmission by the first antenna, and
    wherein the first and second diplexers provide isolation between their second and third ports to further help prevent the receive port of the WLAN transceiver from being exposed to high signal levels from the UWB transceiver.

11. The antenna system of claim 2 wherein the wireless communication device is a notebook computer, and
    wherein when the UWB transceiver and the WLAN transceiver operate simultaneously, a first application running on the notebook computer communicates using the UWB transceiver, and a second application running on the notebook computer communicates using the WLAN transceiver.

* * * * *